US012806513B2

(12) United States Patent
Vogel

(10) Patent No.: US 12,806,513 B2
(45) Date of Patent: Nov. 24, 2026

(54) METHOD FOR MONITORING A COMPUTER PROGRAM, AND COMPUTER PROGRAM PRODUCT

(71) Applicant: DEUTSCHES ZENTRUM FÜR LUFT—UND RAUMFAHRT E.V., Bonn (DE)

(72) Inventor: Jörn Vogel, Wessling (DE)

(73) Assignee: DEUTSCHES ZENTRUM FÜR LUFT—UND RAUMFAHRT E.V., Bonn (DE)

( * ) Notice: Subject to any disclaimer, the term of this patent is extended or adjusted under 35 U.S.C. 154(b) by 724 days.

(21) Appl. No.: 18/032,595

(22) PCT Filed: Oct. 20, 2021

(86) PCT No.: PCT/EP2021/079144

§ 371 (c)(1),
(2) Date: Mar. 1, 2024

(87) PCT Pub. No.: WO2022/084420

PCT Pub. Date: Apr. 28, 2022

(65) Prior Publication Data

US 2024/0286025 A1 Aug. 29, 2024

(30) Foreign Application Priority Data

Oct. 20, 2020 (DE) ......................... 102020127641.9

(51) Int. Cl.
*A63F 13/212* (2014.01)
*A63F 13/35* (2014.01)
*A63F 13/50* (2014.01)

(52) U.S. Cl.
CPC ............ *A63F 13/212* (2014.09); *A63F 13/35* (2014.09); *A63F 13/50* (2014.09)

(58) Field of Classification Search
USPC ............................................................ 463/36
See application file for complete search history.

(56) References Cited

U.S. PATENT DOCUMENTS

2004/0130549 A1* 7/2004 Tinker ...................... G06T 7/30 345/473
2008/0161113 A1* 7/2008 Hansen ................ A63F 13/335 463/42
(Continued)

FOREIGN PATENT DOCUMENTS

DE 10 2016121564 A1 5/2017
WO WO2010105034 A2 9/2010
(Continued)

OTHER PUBLICATIONS

International Search Report for PCT/EP2021/079144, dated Jan. 31, 2022 and IPRP.

*Primary Examiner* — Pierre E Elisca
(74) *Attorney, Agent, or Firm* — Davidson Kappel LLC

(57) ABSTRACT

A method for controlling a computer program with the aid of an input device for detecting electromyography signals and/or actuation movement signals of a user. Probable program sequences are selected from possible program sequences. The selected probable program sequences are executed, at least in part, in advance, and an effective program sequence is selected from the program sequences that have been executed, at least in part, in advance and is made operational. The probable program sequences are selected taking a predicted user input and/or detected electromyography signals into account, and the effective program sequence is selected taking detected electromyography signals and/or detected actuation movement signals into account. Moreover, the invention relates to a computer program product that includes program code sections, via
(Continued)

which such a method may be carried out when the computer program product is executed on a computer.

3 Claims, 2 Drawing Sheets

(56) References Cited

U.S. PATENT DOCUMENTS

| | | | | |
|---|---|---|---|---|
| 2017/0142201 | A1 | 5/2017 | Holmes et al. | |
| 2019/0354173 | A1* | 11/2019 | Young ................ | G02B 27/0093 |

FOREIGN PATENT DOCUMENTS

| | | | |
|---|---|---|---|
| WO | WO 2011133240 | A1 | 10/2011 |
| WO | WO 2013078150 | A1 | 5/2013 |
| WO | WO2020123840 | A1 | 6/2020 |

* cited by examiner

METHOD FOR MONITORING A COMPUTER PROGRAM, AND COMPUTER PROGRAM PRODUCT

The present invention relates to a method for controlling a computer program with the aid of a user-actuatable input device for detecting electromyography signals and/or actuation movement signals of a user. Moreover, the present invention relates to a computer program product.

BACKGROUND

The document WO 2013/078150 A1 relates to a controller for connection to an interactive application. The controller includes a housing that is defined by a main body, a first extension that extends from a first end of the main body, and a second extension that extends from a second end of the main body, the first extension and the second extension being used to be held by a first and second hand, respectively, of a user. The controller also includes an input device that is positioned along an upper surface of the main body, and a touch-sensitive control panel that is deformed along a first side surface of the main body. The application may be executed, for example, by a client and server processing module of a game. Users may in each case interact with game clients who are connected to the server processor via the internet.

A handheld game controller is known from the document DE 10 2016 121 564 A1, including multiple input controllers, a network circuit, a processor, and a power source. The input controllers are designed to detect a user input. The network circuit is designed to communicate with a game streaming service via a communications network. The processor is coupled to the multiple input controllers and to the network circuit, and is designed to communicate with the game streaming service with regard to a game streaming service account and transfer the user input, which is detected by the multiple controllers, to the game streaming service, a communication taking place between the processor and the game streaming service without using a game console. The power source is designed to supply the multiple input controllers, the network circuit, and the processor with power.

The document WO 2020/123840 A1 relates to a video game device including physical biofeedback sensors, a memory medium, and a processor. While the video game player is playing the video game, the biofeedback sensors receive biofeedback measurements from the player, which are then processed to track a visual focus of the video game player while the video game is being played, and to dynamically modify or enhance the play, at least partially, based on the tracked visual focus of the video game player. The biofeedback sensors are positionable at an arm, a wrist, a hand, etc., of the player. Electromyographic (EMG) measurements are mentioned as an example of biofeedback measurements. According to the document WO 2020/123840 A1, biofeedback measurements are analyzed based on trained models in order to predict an interaction of the user with an input device. For example, the video game device may determine, based on the received biofeedback measurements, that the video game player will make an input into an input device of the video game device, such as a mouse, a keyboard, or a handheld controller, and will initiate an action that is triggered by the ascertained next movement of the video game player. The video game device may thus initiate the action before the video game player begins the next movement, so that the next movement is anticipated by the video game device. For example, the video game device may analyze the biofeedback signals to determine that the video game player will press a mouse button. As a response to this determination, the video game device may trigger a mouse click before the video game player actually clicks on the mouse button, as the result of which the user obtains a much faster response time than was previously possible. As a result, the latency between the decision of the video game player to move and the actual movement is reduced.

The document WO 2011/133240 A1 relates to methods and systems for applying biometric data to an interactive program that is executed by a portable device. According to the document WO 2011/133240 A1, raw biosignal data are detected and filtered to determine the biosignal of the user of the interactive program. The biosignal is analyzed to determine biometric data of the user, which are used as input for the interactive program. A setting or a state of the interactive program is changed based on the biometric data. An updated state of the interactive program is displayed to the user, who reflects the change in the setting or the state of the interactive program.

SUMMARY OF THE INVENTION

An object underlying the present invention is to improve a method mentioned above. Moreover, an object underlying the present invention is to provide a computer program product for carrying out the method according to the present invention.

The present invention provides a method for controlling a computer program with the aid of an input device (100) for detecting electromyography signals and/or actuation movement signals of a user, characterized in that probable program sequences are selected from possible program sequences, the selected probable program sequences are executed, at least in part, in advance, and an effective program sequence is selected from the program sequences that have been executed, at least in part, in advance and is made operational, the probable program sequences being selected taking a predicted user input and/or detected electromyography signals into account, and the effective program sequence being selected taking detected electromyography signals and/or detected actuation movement signals into account.

The method may be carried out with the aid of at least one computer. The computer program to be controlled may be a computer game. The computer program to be controlled may include at least one computer program module to be controlled and at least one controlling computer program module. The method may be carried out with the aid of at least one computer program and/or at least one computer program module, in particular at least one computer program module to be controlled and at least one controlling computer program module. A program sequence may be a temporal sequence. A program sequence may include multiple successive steps. A required time period may be associated with each of the steps. A program sequence may be a computer game sequence. Possible program sequences may be program sequences that are possible in principle, depending on the context. Probable program sequences may be program sequences that the user, with a sufficient probability, would like to execute. Probable program sequences may be program sequences that the user would probably like to execute. The number of probable program sequences may be smaller than the number of possible program sequences. Probable program sequences may be determined based on a corresponding intention of the user and/or an activation of corresponding muscle fibers of the user. An activation of muscle fibers of the user may be recognized based on electromyography signals. An effective program sequence may be a program sequence that the user, with sufficient certainty, would like to execute. An effective program sequence may be determined based on a corresponding intention of the user, an activation of corresponding muscle fibers of the user, and/or an actuation movement of the user. In the present case, “execute in advance” means in particular that program sequences or portions of program sequences are executed before an effective program sequence is selected. In the present case, “make operational” means in particular that an effective program sequence is actually executed.

A user input may be predicted with the aid of a mathematical model, for example a Markov model. The electromyography signals may be detected with the aid of a signal detection module for detecting electromyography signals of the user. The actuation movement signals may be detected with the aid of a signal detection module for detecting actuation movement signals of the user.

A program sequence may involve a state determination and an output synthesis. The state determination may be a determination of a state of a computer game. The output synthesis may be an image synthesis. The output synthesis may be a sound synthesis. The output synthesis may be a feedback synthesis. The state determination may be designed to execute, at least in part, the selected probable program sequences in advance. The output synthesis may be designed to execute, at least in part, the selected probable program sequences in advance.

The computer program may be executed in a client-server structure. The client server-structure may include at least one client and at least one server. The at least one client may be a client computer and/or a client program. The at least one server may be a server computer and/or a server program.

A user input may be predicted on the client side and/or on the server side. The electromyography signals and/or the actuation movement signals may be detected on the client side. The selection of the probable program sequences from the possible program sequences may take place on the server side. The selected probable program sequences may be executed, at least in part, in advance on the server side and/or on the client side. The effective program sequence may be made operational on the client side. The probable program sequences that are executed, at least in part, in advance may be transferred, at least in part, in advance from the at least one server to the at least one client. In the present case, “transfer in advance” means in particular that program sequences or portions of program sequences are transferred before an effective program sequence is selected.

The method may be used to control a computer with the aid of a user-actuatable input device. Before and/or during an actuation of the input device by a user, electromyography signals of the user may be detected, and a user input to be expected may be predicted, taking the electromyography signals into account.

The method may be carried out with the aid of at least one processor. The method may be used to control a computer program that is executed on a computer. The method may be used for open-loop and/or closed loop control of the computer and/or the computer program. The method may be used to directly control the computer and/or the computer program. The computer may be a client and/or a local computer. The method may be used to directly control the computer and/or the computer program. The computer may be a server and/or may be part of a server structure. The method may be used to indirectly control the computer and/or the computer program with interconnection of at least one further computer, in particular a client and/or a local computer, utilizing technical interfaces and protocols and/or via a computer network, in particular the internet.

The input device may be actuatable by a user. The input device may be hand-actuatable by a user. The input device may be actuatable by a user with the aid of at least one hand and/or at least one finger. An actuation of the input device may require a controlled movement of a user via cooperative interaction between his/her peripheral nervous system and central nervous system and also muscular system.

The electromyography signals may be detected by measuring changes in potential on the skin of a user. The electromyography signals may be surface electromyography signals. The electromyography signals may be detected by measuring fluctuations in potential at muscles of a user. For the measurement, an electrical activity may be measured for a muscle at rest (spontaneous activity), and for a muscle that is contracted with varying intensity (muscle action potentials). The electromyography signals may include total action potentials of an entire muscle or multiple muscles. The electromyography signals may describe a start and an end of a muscular contraction. The electromyography signals may include characteristic frequency and/or amplitude patterns. A user input to be expected may be predicted based on the electromyography signals. An actual execution of an actuation movement may take place with a time delay relative to an electromyography signal associated with this actuation movement. A time advantage may be achieved with the aid of the electromyography signal.

The electromyography signals of at least one muscle and/or of at least one muscle group of at least one forearm and/or of at least one hand may be detected. The electromyography signals of at least one flexor and/or of at least one extensor may be detected. The electromyography signals of at least one superficial muscle layer may be detected. The electromyography signals of at least one underlying muscle layer may be detected.

Actuation movement signals of a user may be detected during an actuation of the input device by a user. The actuation movement signals may be combined with the electromyography signals. The actuation movement signals may be combined with the electromyography signals in order to predict a user input to be expected and/or to improve a prediction. Actuation movement signals of at least one hand movement and/or of at least one finger movement may be detected.

A user input to be expected may be predicted with the aid of a model. The model may be a technical model, in particular a closed-loop control model, and/or a mathematical model.

A prediction of a user input to be expected may be improved via machine learning. The machine learning may follow an algorithmic approach. The machine learning may take place unsupervised.

A prediction of a user input to be expected may be used to reduce a latency that is perceivable by the user. A latency that is perceivable by the user may be a latency that is subjectively perceivable. A latency that is perceivable by the user may be a time period between an actuation of the input device and the occurrence of an expected subsequent event.

Instead of a prediction, based on the EMG signals the user input may be identified, based on the electromechanical delay, before the user physically interacts with the input device. This early detection of the user input may be utilized to control the early computation by software components.

Taking into account the early detection of a user input to be expected, modules of a computer program may be selected and/or executed in advance. Modules of a computer program may be selected and/or executed in advance in order to prepare an output of an expected subsequent event to the user.

In anticipation of a possible user input, multiple modules of a computer program that represent different responses to different possible user inputs may be computed in advance, and upon early detection of the user input based on the EMG signals, may be output to the user without delay.

The method may be used in a client-server system. The input device may be associated with a client and/or a local computer. The computer may be associated with a server and/or a server structure. The client and/or the local computer on the one hand and the server and/or the server structure on the other hand may be connected to one another, utilizing technical interfaces and protocols and/or via a computer network, in particular the internet.

In anticipation of a user input, various program sequences that represent responses to different user inputs may be computed on the server and transferred to the client. Upon occurrence of the physical user input via the input device, the program sequence, appropriately computed in advance, may be output to the user, thus saving the time for computing the program sequence and the data transfer from the server to the client.

In anticipation of a user input, various program sequences that represent responses to different user inputs may be computed on the server and transferred to the client. Upon early detection of a certain user input, the program sequence, appropriately computed in advance, may be output to the user, thus saving the time from the electromechanical delay as well as the time for computing the program sequence and the data transfer from the server to the client.

The early detection of a user input based on the EMG signals may be utilized to select which program sequences are to be preliminarily computed, in order to display these precomputed program sequences to the user upon occurrence of the physical user input.

The method may be used to control computer games that are executed with the aid of the computer. The method may be used in cloud gaming.

The input device may be used to carry out the method according to the present invention. The input device may include a base module. The base module may include a housing, at least one processor, at least one data memory, at least one data transfer interface, a force feedback device, an optical output device, and/or a power supply. The housing may be designed for the input device to be held in one or both hands of a user. The data transfer interface of the base module may be used for hard-wired and/or wireless data transfer. The data transfer interface may be used for the data transfer between the input device and a computer, in particular a client computer.

The input device may include at least one first signal detection module for detecting electromyography signals of a user. The at least one first signal detection module may include a discharge device for electromyography signals. The at least one first signal detection module may be connectable structurally separately from the base module, and/or may be connectable to the base module in a signal-conducting manner. The first signal detection module may include at least one data transfer interface and/or a power supply. The data transfer interface of the at least one first signal detection module may be used for hard-wired and/or wireless data transfer. The data transfer interface of the base module and/or the data transfer interface of the at least one first signal detection module may be used for the data transfer between the base module and the at least one first signal detection module.

The at least one first signal detection module may include at least one surface electrode. The at least one first signal detection module may include multiple surface electrodes. The surface electrodes may have a predetermined arrangement. The surface electrodes may have a fixed arrangement. The surface electrodes may have a changeable arrangement. The at least one surface electrode may have a circular, oval, quadrilateral, or strip-like shape. The at least one surface electrode may have a unipolar, bipolar, differential, double-differential, and/or multi-differential design.

The at least one first signal detection module may have a cuff-like design. The at least one first signal detection module may be placeable and/or removable. The at least one first signal detection module may be placeable at a shoulder, an upper arm, a forearm, a hand, and/or a finger of a user.

The at least one first signal detection module may include at least one implantable electrode. The at least one first signal detection module may include multiple implantable electrodes. The implantable electrodes may have a predetermined arrangement. The at least one implantable electrode may be externally inductively suppliable with electrical power.

The input device may include at least one second signal detection module for detecting actuation movement signals of a user. The at least one second signal detection module may be structurally integrated into the base module and/or connected to the base module in a signal-conducting manner. The at least one second signal detection module may be designed for operation of the input device using one or both hands and/or one or multiple fingers of a user. The at least one second signal detection module may include at least one control element. The at least one control element may be a button, a switch, an analog stick, or a directional pad.

The at least one second signal detection module may include at least one sensor. The at least one sensor may be a proximity sensor, pressure sensor, and/or force sensor. The at least one sensor may be situated at the housing of the base module. The at least one sensor may be situated at the at least one control element of the second signal detection module.

The input device may be designed as a game controller, in particular as a gamepad.

The computer program product may be installable and/or executable on a computer and/or in a computer network.

In summary and in other words, the present invention results, among other things, in a method for EMG-assisted improvement in the delay of user inputs.

A measurement of a muscle activity is combined with signals of a game controller/joystick of a user. On this basis, a model may be computed which subsequently allows a prediction of desired control commands of the user before they can be detected by the game controller.

This may be used in various variants in conjunction with cloud gaming or also with conventional gaming. The prediction of the user command may thus be directly utilized to control the game, which would directly reduce the delay and thus enhance a user experience. Alternatively, the prediction may be utilized to select which possible game contents are to be computed in advance, in order to then display this precomputed game content to the user upon occurrence of a physical user command.

This type of application may be implemented in a particularly satisfactory manner, since the user will continue to operate the game controller. The model for predicting the user commands may thus be compared to the actual inputs at any time, and may thus be checked and adapted.

Due to the combination of a conventional game controller with an EMG-based prediction, user inputs may be detected more quickly than is possible with a conventional game controller alone. A delay which results during cloud gaming due to the necessary data transfer via the internet may thus be improved.

Due to the detection of the EMG signals, it may be computed whether the user will soon change his/her present user command. This information may be used in cloud gaming to control a precomputation of possible game contents, since via the EMG signals it may be ascertained with a high probability which contents are needed.

When playing in conventional gaming, the combination of a conventional game controller with an EMG-based prediction may be applied to speed up a detection of user inputs, and thus improve an overall response time. Such an EMG-based game controller may thus provide a player with an advantage over players using conventional controllers.

In order to have better information concerning which input buttons the user intends to press, buttons of the controller may be equipped with sensors that detect an approach of a finger. In combination with the EMG signals, which allow the actual pressing of the button to be recognized early, a reliable prediction may thus be made.

Operational quality and/or operational convenience of a computer and/or of a computer program may be increased by use of the present invention. A time period between an input and the occurrence of an expected subsequent event may be shortened. For a computer game, a player experience and/or a player success may be enhanced.

BRIEF DESCRIPTION OF THE DRAWINGS

Exemplary embodiments of the present invention are described in greater detail below with reference to figures which show the exemplary embodiments schematically and by way of example.

DETAILED DESCRIPTION

Figure 1:
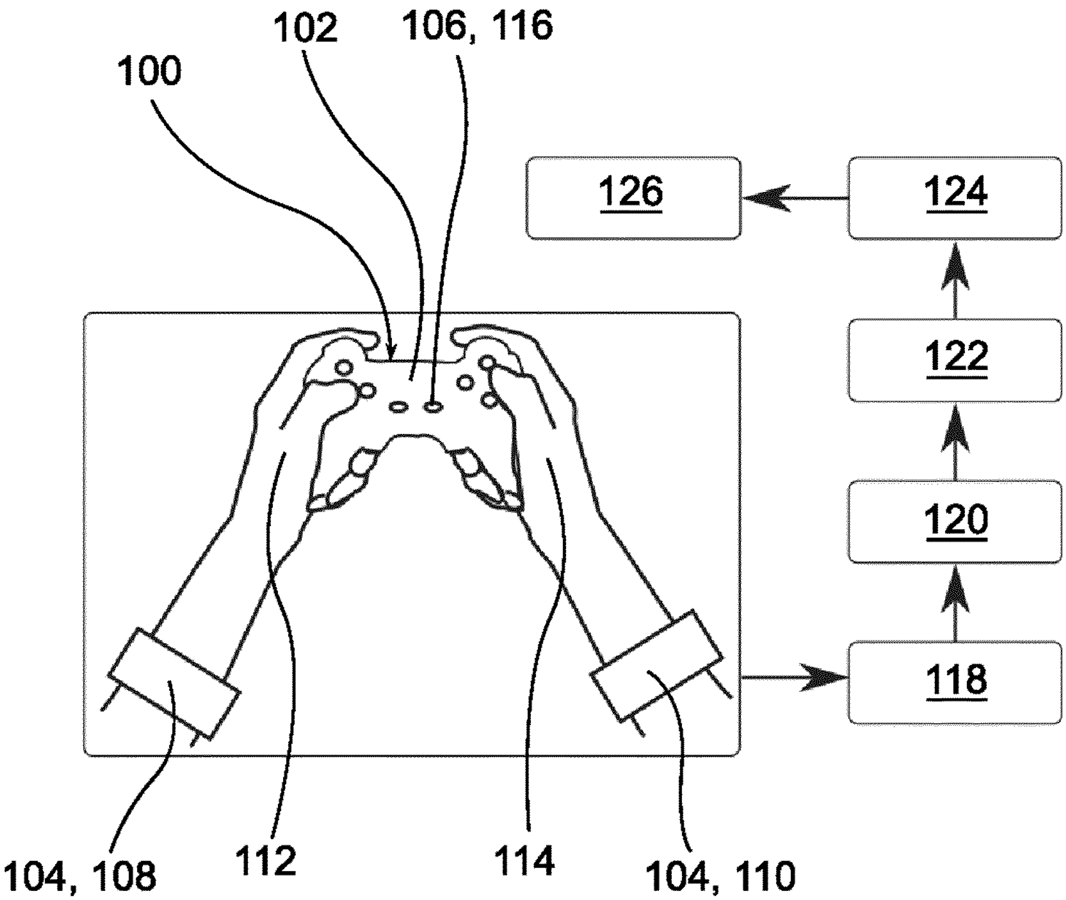
FIG. 1 shows a user actuation of an input device that includes a base module, a first signal detection module, and a second signal detection module, and a shortening of a time period between an input and an expected visualization, taking into account electromyography signals of the user.

FIG. 1 shows a user actuation of an input device 100 designed as a game controller. Input device 100 includes a base module 102, a first signal detection module 104, and a second signal detection module 106.

Base module 102 is wirelessly connected to a local client via a radio link, and is designed for input device 100 to be held in one or both hands of the user. The client is connected to an external server structure via the internet. A game runs on the server structure, and the server structure receives user inputs from the user via the server structure via the internet, and in turn sound signals and video signals are sent to the client, and from there are output to the user.

First signal detection module 104 is used to detect electromyography signals of the user, and includes two cuffs 108, 110 with surface electrodes that are placeable at forearms 112, 114 of the user, and that are wirelessly connected to base module 102 via a radio link.

Second signal detection module 106 is used to detect actuation movement signals of the user, and includes a control element such as a button 116. The control elements are designed to operate input device 100 with the aid of the fingers, such as thumbs or index fingers, of the user.

To shorten a time period between a user input and an expected visualization, a data detection 118 initially takes place in which, in addition to the detection of the user input with the aid of the control elements such as buttons 116, electromyography signals of the user are detected before and/or during an actuation with the aid of cuffs 108, 110, using surface electrodes. Taking into account the detected electromyography signals, a model formation 120 and a prediction of a user input to be expected subsequently take place. The predicted user input to be expected is subsequently transmitted to the external server structure, in which processing 124 takes place, and for example game contents are selected and computed in advance. After user input with the aid of the control elements such as buttons 116, an output 126 of the game contents computed in advance for the user takes place at the client.

Figure 2:
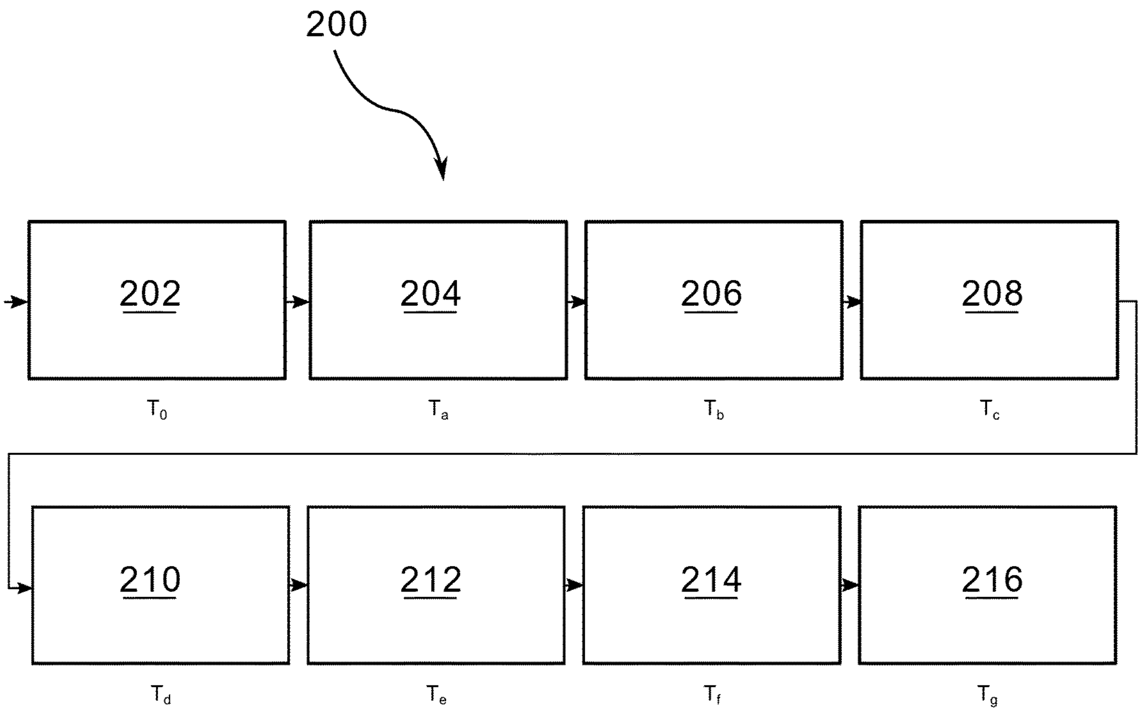
FIG. 2 shows a temporal program sequence including multiple successive steps.

FIG. 2 shows a temporal program sequence 200 in a client-server structure, including multiple successive steps 202, 204, 206, 208, 210, 212, 214, 216, each of which requires a different amount of time. A user intention takes place in step 202, and a time period $T_0$ is associated with step 202. An activation of the muscle fibers of the user takes place in step 204, and a time period $T_a$ is associated with step 204. A physical interaction of the user with the input device (reference numeral 100 in FIG. 1) takes place in step 206, and a time period $T_b$ is associated with step 206. A transfer of the user input to a server takes place in step 208, and a time period $T_c$ is associated with step 208. A state determination or computation of a program sequence takes place in step 210, and a time period $T_d$ is associated with step 210. An output synthesis or computation of an associated graphical output takes place in step 212, and a time period $T_e$ is associated with step 212. A transfer to a client application takes place in step 214, and a time period $T_f$ is associated with step 214. A representation in the client application takes place in step 216, and a time period $T_g$ is associated with step 216.

Different application examples A, B, C, D, and E may be implemented for program sequence 200, each of which may provide certain time savings and thus reduce the latency.

Application example A: The user input is ascertained directly from the EMG signals. Due to the electromechanical delay, this ascertainment results in a time advantage compared to the physical activation of a button on the input device. The effective program sequence may thus be established earlier, since the user input may be detected earlier than with the physical input device alone. In the optimal case, this time advantage of the EMG measurement thus results in a reduction of the latency by time $T_b$.

Application example B: The user input is ascertained directly from the EMG signals. Due to the electromechanical delay, this ascertainment results in a time advantage compared to the physical activation of a button on the input device. Based on the EMG-based user input, a probable program sequence is computed, taking the user input into account, and in addition an alternative probable program sequence is computed without taking the user input into account. Upon occurrence of the physical user input, the corresponding effective program sequence is output to the user. If the physical input does not occur because the EMG-based ascertainment was erroneous, the alternative program sequence is output as the effective program sequence. In this application, a time advantage results which corresponds to the duration of the computation of the program sequence (maximum time savings: $T_d+T_e$).

Application example C: A prediction of which user input is to be expected is made, for example based on Markov models. Based on this prediction, probable program sequences are computed in advance. The EMG signals are used to recognize the user input early, and based on this EMG-based recognition, to display the corresponding effective program sequence to the user. Besides the time advantage from the EMG measurement, an additional time advantage results here due to the advance computation of possible program sequences (maximum time savings: $T_b+T_d+T_e$).

Application example D: Analogous to C, existing approaches are used to make a prediction of which user input is to be expected. Based on this prediction, probable program sequences are computed in advance. The EMG signals are used to recognize the user input early, whereupon only a reduced selection of probable program sequences that are computed in advance are transmitted to the user. Upon occurrence of the physical interaction with the input device, the relevant program sequence may then be visualized as an effective program sequence for the user. In addition to the reduction of the latency, this also results in a reduction of the necessary data traffic in a client server application, since a reduction of the possible program sequences may take place using the EMG signal (maximum time savings: $T_d+T_e+T_f$).

Application example E: Analogous to C, existing approaches are used to make a prediction of which user input is to be expected. Based on this prediction, probable program sequences are computed in advance and transmitted to the client application. The EMG signals are used to recognize the user input early, whereupon the relevant program sequence may be visualized as an effective program sequence in the client application. This results in a reduction of the possible program sequences, with a maximum time savings of $T_b+T_d+T_e+T_f$.

Application examples A, B, and C may be used for cloud gaming approaches as well as for locally executed applications. Examples D and E specifically concern a client-server application such as cloud gaming, for example. For locally executed applications, time periods $T_c$ and $T_f$ are omitted since no transfer to a server has to take place. In particular for gaming applications, it may be relevant to regard the computation of the game state and the rendering of the game graphics as two successive steps, and to selectively apply the advance computation only to the computation of the game state or to both steps.

The word "may" refers in particular to optional features of the present invention. Consequently, there are also refinements and/or exemplary embodiments of the present invention which additionally or alternatively have the particular feature or the particular features.

Of the feature combinations provided in the present case, isolated features may also be selected if necessary, and with dissolution of a structural and/or functional relationship that may possibly exist between the features, may be used in combination with other features for delimiting the subject matter of the claims.

LIST OF REFERENCE NUMERALS

100 input device
102 base module
104 first signal detection module
106 second signal detection module
108 cuff
110 cuff
112 forearm
114 forearm
116 button
118 data detection
120 model formation
122 prediction
124 processing
126 output
200 program sequence
202 step
204 step
206 step
208 step
210 step
212 step
214 step
216 step

What is claimed is:

1. A method for controlling a computer program executed in a client-server structure that includes at least one client and at least one server connected via a computer network, with the aid of an input device for detecting electromyography signals or actuation movement signals of a user, the input device including surface electrodes placeable on the user to detect electromyography signals of at least one flexor or extensor, and at least one control element to detect actuation movement signals, the method comprising the steps of:

predicting, based at least on the detected electromyography signals, a user input before the user physically interacts with the input device, using an electromechanical delay between the electromyography signals and the physical actuation;

selecting, on the server, probable program sequences from possible program sequences taking the predicted user input or the detected electromyography signals into account;

executing the selected probable program sequences, at least in part, in advance on the server and/or on the client, each program sequence comprising a state determination and an output synthesis;

transferring the probable program sequences that have been executed at least in part in advance from the server to the client over the computer network; and selecting at the client, an effective program sequence from the program sequences that have been executed, at least in part, in advance, taking the detected electromyography signals or detected actuation movement signals into account; and making the effective program sequence operational at the client such that a latency, perceivable by the user, between actuation of the input device and the occurrence of an expected subsequent event is reduced by an amount including at least the electromechanical delay and the time for transferring the effective program sequence from the server to the client.

2. The method as recited in claim 1 wherein the electromyography signals or the actuation movement signals are detected on the client side.

3. A computer program product comprising program code sections via which the method as recited in claim 1 is carried out when the computer program product is executed on a computer.

* * * * *